(12) United States Patent
Nakao

(10) Patent No.: US 8,228,921 B2
(45) Date of Patent: Jul. 24, 2012

(54) RADIO APPARATUS

(75) Inventor: Seigo Nakao, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 1169 days.

(21) Appl. No.: 11/522,911

(22) Filed: Sep. 19, 2006

(65) Prior Publication Data
US 2007/0064591 A1 Mar. 22, 2007

Related U.S. Application Data

(60) Provisional application No. 60/718,726, filed on Sep. 21, 2005.

(51) Int. Cl.
*H04L 12/56* (2006.01)
(52) U.S. Cl. ............... 370/395.4; 370/208; 370/281; 370/295; 370/310.2; 370/328; 370/330; 370/338; 370/344; 370/349; 370/429; 370/474; 370/480; 455/422.1
(58) Field of Classification Search .......... 370/208, 370/281, 295, 310.2, 328–339, 344, 349, 370/395.4, 395.41, 395.42, 429, 474, 480; 455/422.1
See application file for complete search history.

(56) References Cited

U.S. PATENT DOCUMENTS

| | | | |
|---|---|---|---|
| 2002/0118666 A1* | 8/2002 | Stanwood et al. | 370/345 |
| 2002/0119783 A1* | 8/2002 | Bourlas et al. | 455/453 |
| 2003/0076777 A1 | 4/2003 | Stuber | |
| 2004/0081073 A1 | 4/2004 | Walton | |
| 2005/0180386 A1* | 8/2005 | Hansen et al. | 370/350 |

FOREIGN PATENT DOCUMENTS

| | | |
|---|---|---|
| EP | 1 524 813 | 4/2005 |
| JP | 2006-179878 | 6/2006 |
| WO | WO 03/001702 | 1/2003 |

OTHER PUBLICATIONS

Sinem Coleri et al., "Channel Estimation Techniques Based on Pilot Arrangement in OFDM Systems," IEEE Transactions on Broadcasting, Sep. 2002, pp. 223-229, vol. 48, No. 3.
Ogawa Y et al., "A MIMO-OFDM system for high-speed transmission", Vehicular Technology Conference, 2003, pp. 493-497 vol. 1, XP010700945, Oct. 2003.
International Search Report dated Nov. 28, 2006.

* cited by examiner

*Primary Examiner* — Hoon J Chung
(74) *Attorney, Agent, or Firm* — DC Patent Lawyers, PLLC

(57) ABSTRACT

A control unit assigns a plurality of data signals in a manner that, of the plurality of data signals, data signals of higher data rate are assigned anteriorly. Of terminal apparatuses to which the plurality of data signals are to be transmitted respectively, the control unit specifies a terminal apparatus to which a training signal is to be transmitted. If the data signal to be sent to the specified terminal apparatus is contained in an anterior part of the packet signal, the control unit will append a training signal to a front part preceding a leading data signal. If the data signal to be sent to the specified terminal apparatus is not contained in an anterior part of the packet signal, the control unit will move this data signal to a posterior part of the packet signal and then append a training signal to a front part preceding this moved data signal.

14 Claims, 14 Drawing Sheets

FIG.5A

| L-STF | L-LTF | L-SIG | HT-SIG | HT-STF | HT-LTF | HT-LTF | -HT-LTF | DATA 1 |
|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | DATA 4 -600ns |

FIG.5B

| L-STF | L-LTF | L-SIG | HT-SIG | HT-STF | HT-LTF | HT-LTF | DATA 1 |
|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | DATA 2 -400ns |

FIG.8

| HT-STF1 | HT-LTF1 | HT-SIG1 | HT-LTF5 | HT-LTF9 | HT-LTF13 | HT-LTF17 | DATA A |
| HT-STF2 -50ns | HT-LTF2 -50ns | HT-SIG2 -50ns | HT-LTF6 -50ns | HT-LTF10 -50ns | HT-LTF14 -50ns | HT-LTF18 -50ns | DATA B -50ns |
| HT-STF3 -100ns | HT-LTF3 -100ns | HT-SIG3 -100ns | HT-LTF7 -100ns | HT-LTF11 -100ns | HT-LTF15 -100ns | HT-LTF19 -100ns | DATA C -100ns |
| HT-STF4 -150ns | HT-LTF4 -150ns | HT-SIG4 -150ns | HT-LTF8 -150ns | HT-LTF12 -150ns | HT-LTF16 -150ns | HT-LTF20 -150ns | DATA D -150ns |

RADIO APPARATUS

RELATED APPLICATIONS

This application claims the benefit of U.S. Provisional Patent Application No. 60/718,726, filed on Sep. 21, 2005 the disclosure of which Application is incorporated by reference herein.

BACKGROUND OF THE INVENTION

1. Field of the Invention

The present invention relates to radio apparatuses, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of a plurality of packets is called "stream"). That is, streams up to the maximum number of antennas are set for the communications between the transmitting apparatus and the receiving apparatus so as to improve the data transmission rates.

Moreover, combining this MIMO system with the OFDM modulation scheme results in a higher data transmission rate. In the MIMO system, the data rate can also be adjusted by increasing or decreasing the number of antennas to be used for data communications. Furthermore, the data rate can be adjusted in greater detail by applying the adaptive modulation to the MIMO system. To perform such an adjustment of data rates more reliably, the transmitting apparatus should acquire from the receiving apparatus the information on data rates suited for the radio channel between the transmitting apparatus and the receiving apparatus (hereinafter referred to as "rate information"). To raise the accuracy of the rate information like this, it is desired that the channel characteristics between a plurality of antennas in the transmitting apparatus and a plurality of antennas contained in the receiving apparatus, respectively, be acquired by the receiving apparatus.

Examples of the combinations of directivity patterns in the antennas of the transmitting apparatus and receiving apparatus in a MIMO system are as follows. One example is a case where the antennas of a transmitting apparatus have omni patterns and the antennas of a receiving apparatus have patterns in adaptive array signal processing. Another example is a case where both the antennas of the transmitting apparatus and those of the receiving apparatus have patterns in adaptive array signal processing. This is also called the beamforming. The system can be simplified in the former case. In the latter case, however, the directivity patterns of antennas can be controlled in greater detail, so that the characteristics thereof can be improved. Since in the latter case the transmitting apparatus performs adaptive array signal processing for transmission, it is necessary to receive beforehand from the receiving apparatus the known signals by which to estimate channels.

To improve the accuracy of rate information and the accuracy of beamforming in the above-mentioned requirements, it is necessary that the channel characteristics be acquired with high accuracy. To improve the accuracy in the acquisition of channel characteristics, it is desirable that the channel characteristics between a plurality of antennas contained in the transmitting apparatus and those in the receiving apparatus be acquired respectively. For this reason, the transmitting apparatus or the receiving apparatus transmits from all of antennas the known signals for use in channel estimation. Hereinafter, the known signals, for use in channel estimation, transmitted from a plurality of antennas will be referred to as "training signals" independently of the number of antennas to be used for data communication.

On the other hand, CSMA (Carrier Sense Multiple Access) is carried out to allow the base station apparatus to multiplex the communication with a plurality of terminal apparatuses. In this case, it is desirable that the length of packet signal be longer to improve the transmission efficiency. For that purpose, the base station apparatus aggregates the data for a plurality of terminal apparatuses into a single packet signal. Each terminal apparatus extracts the data transmitted thereto, from the received packet signal.

The radio transmission path, or the radio channel, between the base station and terminal apparatus generally varies with time. Thus there are cases where the radio transmission channel varies between the receive start timing and receive end timing of packet signals. Even in such a case, the deterioration in receiving characteristics can remain small if the terminal apparatus updates the weights and the like in a manner of keeping track of and effecting the fluctuation of radio transmission path during a period in which the packet signals are being received. On the other hand, with the purpose of reducing the processing amount in the terminal apparatus or reducing the circuit scale, the weights are set when the packet signals are received and said weights are fixedly used during the receiving of the packet signals. In this case, when the length of packet signal becomes longer, the receiving characteristics deteriorate. In particular, if the data for a plurality of terminal apparatuses are contained in a single packet signal, the possibility increases that a terminal apparatus which is to receive data placed in a posterior part of the packet signal cannot receive all of the data.

Under these circumstances, the inventor of the present invention came to recognize the following problems to be solved. In order not to lower the transmission efficiency, it is not desired that a known signal for use in channel estimation is assigned to an intermediate part of a packet signal. Also, even in the case when the packet signal for channel estimation is not assigned to the midway part of a packet signal, it is desired that the deterioration of receiving characteristics be prevented. Even in the case when a plurality of data signals are contained in a packet signal, it is also desired that the degradation of accuracy in channel estimation be prevented.

SUMMARY OF THE INVENTION

The present invention has been made under such circumstances and a general purpose thereof is to provide a radio apparatus that enhances the accuracy of channel estimation by preventing the degradation in transmission efficiency at the time of transmitting known signals for use in channel estimation.

In order to solve the above problems, a radio apparatus according to one embodiment of the present invention comprises: an input unit which inputs a plurality of data signals, each data signal being composed of at least one stream; a generation unit which generates a packet signal by arranging the plurality of data signals in a manner that, among the plurality of data signals inputted in the input unit, a data signal of a higher data rate is assigned in an anterior part; a specifying unit which specifies a terminal apparatus to which known signals, whose number of streams is greater than that of data signals, are to be transmitted, among terminal apparatuses to which the plurality of data signals contained in the packet signal generated by the generation unit are to be transmitted respectively; an adding unit including: a first adding means which appends the known signals, whose number of streams is greater than that of data signals, to a position anterior to a leading data signal when a data signal which is to be transmitted to the terminal apparatus specified by the specifying unit is contained in an anterior part of the packet signal generated by the generation unit; and a second adding means which moves a data signal to a posterior part of the packet signal and then appends a known signal, whose number of streams is greater than that of data signals, to an anterior part preceding the moved data signal and which appends known signals, whose number of streams corresponds to the number of data signals, to a position anterior to the leading data signal when the data signal which is to be transmitted to the terminal apparatus specified by the specifying unit is not contained in the anterior part of the packet signal generated by the generation unit; and a transmitter which transmits a packet signal to which the known signal has been appended by the adding unit.

According to this embodiment, the known signals, whose number of streams is greater than the number of streams for the data signals, are assigned to a header portion of a packet signal. Thus the known signal for a packet signal and the known signal whose number of streams is greater than the number of streams for the data signal can be put to a common use. As a result, the deterioration of transmission efficiency can be prevented.

The generation unit may be such that a data signal of a higher data rate is assigned to an anterior part of packet signal and a data signal of a lower data rate is assigned toward a posterior part of packet signal. In this case, a terminal apparatus in which a low data rate is required is assigned to a posterior part of the packet signal and therefore the deterioration of receiving characteristics can be prevented.

At the time of generating the packet signal, the generation unit may append control signals, indicating a terminal apparatus that should transmit a data signal, to the plurality of signal data, respectively.

The radio apparatus may further comprise a receiving unit which receives a request indicating that a known signal, whose number of streams is greater than that of data signals, needs to be transmitted. The specifying unit may specify a terminal apparatus corresponding to the request received by the receiving unit.

The specifying unit may specify a terminal apparatus which has not received information on data rate over a certain period of time, and when appending the known signal, whose number of streams is greater than that of data signals, to the data signals which are to be transmitted to the terminal apparatus specified by the specifying apparatus, the adding unit may append a request indicating that the information on data rate needs to be transmitted.

When appending known signals, whose number of streams is greater than that of data signals, the adding unit may append the known signals to a main stream where a data signal is assigned and a sub-stream where no data signal, respectively, and may assign a known signal in the sub-stream to a timing other than a timing to which a data signal and a known signal in the main stream are assigned. In such a case, the timing, to which a known signal is assigned, in a stream where a data signal is assigned is shifted or staggered from the timing, to which a known signal is assigned, in a stream where no data signal is assigned. Hence, the received powers of both the streams can be brought closer to each other and the deterioration of estimation in identifying a channel can be prevented.

The adding unit may be such that using a known signal, as a reference, assigned to one of main streams, a cyclic timing shift within a known signal is applied to a known signal assigned to the other streams and a timing shift is also applied to an extensional known signal assigned to sub-streams, degrees of priority are set beforehand to amounts of timing shift and, for the main streams, the amounts of timing shift are used, in order, from one having a higher degree of priority, and for the sub-streams, too, the amounts of timing shift are used, in order, from one having a higher degree of priority. In such a case, the degrees of priority is defined in the amounts of timing shift and, for a stream where a data signal is assigned and for a stream where no data signal is assigned, the amounts of timing shift are used, in order, from one having a higher degree of priority. Hence, more of the same timing shift amounts can be used.

The adding unit may be such that using a known signal, as a reference, assigned to one of main streams, a cyclic timing shift within a known signal is applied to a known signal assigned to the other streams and a timing shift is also applied to an extensional known signal assigned to sub-streams, and different values of amounts of timing shift are set to the plurality of streams, respectively. In such a case, the timing shift amounts for the respective known signals assigned to a plurality of streams are of the same values. Hence, even when there are changes in streams that have data assigned, it can be dealt with easily in the receiver side.

In the adding unit, the known signal and the extensional known signal may be formed by repeating a predetermined unit in time domain, a combination of signs of the predetermined unit may be defined so that an orthogonality holds among the streams, and at the same time the combination of signs of the predetermined unit may be so defined as to be fixed in the plurality of streams, respectively. In this case, the combination of signs is fixed, the processing can be made simpler.

The "predetermined unit" may be applicable in a case defined not only by the time domain but also the frequency domain. In the latter case, the durations corresponding respectively to a plurality of units may differ from one another when the predetermined unit is converted to the time domain.

In the adding unit, the known signal and the extensional known signal are formed by repeating a predetermined unit in time domain, while a combination of signs of the predetermined unit may be defined so that an orthogonality holds among the streams, a degree of priority is given beforehand to the combination of signs of the predetermined unit, and for the main streams, combinations of signs are used in order, from one having a higher degree of priority and, for the sub-stream, too, combinations of signs are used in order, from one having a higher degree of priority. In this case, the combinations of signs are used, in order, from one having a higher degree of priority. Hence, a common circuit can be used in both the calculation of channel characteristics for streams where no data signal is assigned and the calculation of channel characteristics for streams where a data signal is assigned.

The adding unit may be such that the cyclic timing shift is applied to a data signal and an amount of timing shift for the main stream is used as the amount of timing shift. In this case, the data signal can be demodulated.

The radio apparatus may further comprise a modification unit which modifies at least a data signal, to which the known signal has been appended, among the packet signals to which the known signal has been appended, and outputs a modified signal to the transmitter. The modification unit including: a first processing unit which extends the number of main streams up to the number of a plurality of streams and then, for the extended stream, applies a cyclic timing shift within a known signal to a known signal assigned to the other streams using as a reference a known signal assigned to one of the extended streams; and a second processing unit which extends the number of sub-streams up to the number of a plurality of streams and then, for the extended streams, applies a cyclic timing shift within an extensional known signal to an extensional known signal assigned to the other streams using as a reference an extensional known signal assigned to one of the extended streams. The amount of timing shift may be set in a manner that the respective values of timing shift amounts used for the streams extended in the first processing unit are respectively equal to those for the streams extended in the second processing unit.

The absolute value of the timing shift amount in the adding unit may be so set as to be greater than that in the modification unit.

Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 5A and 5B illustrate packet formats depicted in more detail over those shown in FIG. 4;

FIG. 8 illustrates a packet format of packet signals to be finally transmitted in a communication system shown in FIG. 2;

DETAILED DESCRIPTION OF THE INVENTION

Figure 1:
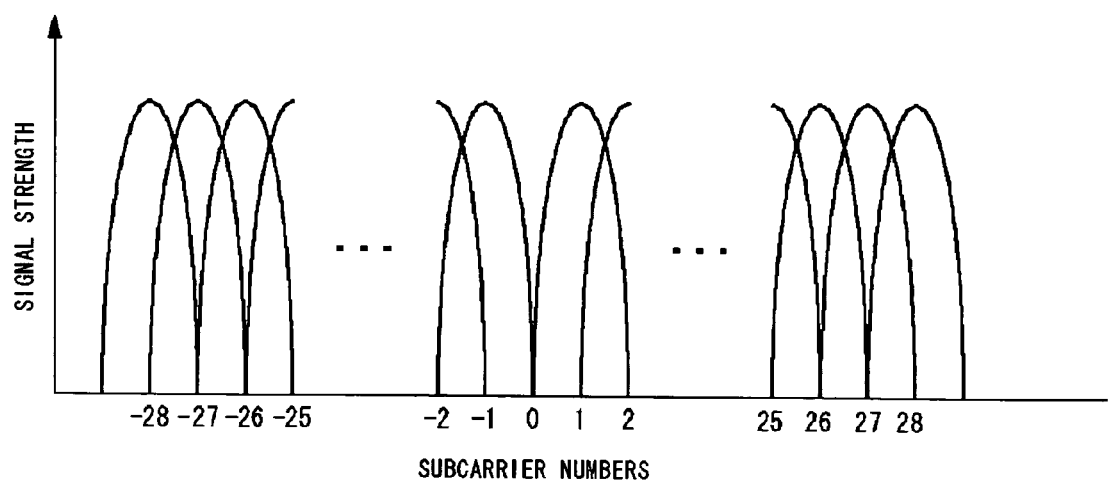
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

An outline of the present invention will be given before a specific description thereof. Embodiments of the present invention relate to a MIMO system comprised of at least two radio apparatuses. One of the radio apparatuses corresponds to a transmitting apparatus whereas the other thereof corresponds to a receiving apparatus. The transmitting apparatus generates one packet signal composed of a plurality of streams. In particular, a description will be given here of a processing performed when the transmitting apparatus transmits training signals. Any known technique may be used for the adaptive modulation processing using the aforementioned rate information and the beamforming and therefore the repeated explanation will be omitted here.

The transmitting apparatus corresponds to a base station apparatus. The base station apparatus basically performs CSMA on a plurality of terminal apparatuses. In order to enhance the transmission efficiency, the base station apparatus aggregates a plurality of data into a single packet signal so as to be transmitted. The present embodiment is based on the assumption that the speed of data for a terminal apparatus is set variably. For example, the coding rate of error correction and the modulation scheme are set variably. It is to be noted that although the data rate is set variably by increasing or decreasing the number of streams in a MIMO, it is assumed here for the clarity of explanation that the number of streams does not change in each packet. At the time of receiving packet signals, a plurality of terminal apparatuses derive weights from known signals placed in the header portions of the packet signals, respectively, and execute adaptive array signal processing while using said weights derived. That is, the weight is not updated in the middle of a packet signal. Under such circumstances, a base station apparatus needs to take a countermeasure to restrict the deterioration in the receiving characteristics for a terminal apparatus which is to receive data assigned in a posterior part of a packet signal.

On the other hand, when a training signal is to be sent to a terminal apparatus, a training signal is assigned to a position anterior to a data signal to the terminal apparatus. Since there is a need that the channel estimation using a training signal be performed with extreme precision, the training signal needs to be transmitted independently of a plurality of data signals. Even in a case where a training signal is to be added, the degradation of transmission efficiency needs to be restricted as much as possible. For that purpose, the following processings will be carried out in the present embodiment.

The base station apparatus assigns the data of a high data rate to an anterior part of the packet signal, and assign the data of a low data rate to a posterior part of the packet signal. When the data speed is regulated by the modulation scheme alone, the data of a modulation scheme having a larger number of multi-level, for example, the data of 64-QAM (Quadrature Amplitude Modulation) is assigned to a front part and the data of a modulation scheme having a smaller number of multi-level, for example, the data of BPSK (Binary Phase-Shift Keying) is assigned to a posterior part. A terminal apparatus acquires, from among the packet signals, the data which is destined thereto and demodulates the acquired data. A terminal apparatus which shall demodulate the data of a high data rate acquires the data placed in an anterior part of the packet signal.

Accordingly, the difference between the timing at which the weights are derived and the timing at which the data are assigned becomes small. As a result, the error in weights on account of the variation in radio channel becomes smaller and therefore the deterioration in the receiving characteristics becomes smaller. On the other hand, a terminal apparatus which shall demodulate the data of a low data rate acquires the data placed in a posterior part of the packet signal. Thus, difference between the timing at which the weights are derived and the timing at which data are assigned becomes large. As a result, the error in weights due to the variation in radio channel becomes larger, too. However, the deterioration in the receiving characteristics due to the error in weights is prevented if the data rate is low.

A base station apparatus specifies a terminal apparatus to which a training signal shall be transmitted. If a data signal for the thus specified terminal apparatus is assigned to a leading part of packet signal, the training signal will be appended to a leading part of packet signal. With this processing, a known signal and a training signal for packet signal can be put to a common use, so that the degradation of transmission efficiency can be restricted. If, on the other hand, a data signal for the thus specified terminal apparatus is not assigned to a leading part of packet signal, said data signal will be moved to a rearmost part of packet signal and then the training signal will be appended to a position anterior to the data which has just been moved. With this processing, the training signal can be transmitted independently of a plurality of the other data signals, the accuracy in channel estimation in the terminal apparatus can be enhanced.

Another object to be solved by the present invention is expressed as follows. When a training signal is transmitted, the number of streams in which the known signals for channel estimation (hereinafter referred to as "channel estimation known signals") are contained differ from the number of streams in which data are contained. A known signal for setting the AGC (Automatic Gain Control) at a receiving side (hereinafter referred to as "AGC known signal") is assigned to a position anterior to the channel estimation known signal. When the AGC known signal is assigned to the only stream where data are assigned, one of channel estimation known signals is received in a state where no AGC known signal is assigned anterior thereto. In particular, when the strength of AGC known signal becomes smaller, the gain of AGC is set to a somehow large value.

In so doing, if the strength of a channel estimation known signal in a stream where no AGC known signal is assigned is large, there is a possibility that the channel estimation known signal might be so amplified by AGC as to cause distortion. As a result, the error in channel estimation based on the channel estimation known signal will be large. If, on the other hand, an AGC known signal is assigned to a stream where a channel estimation known signal is assigned, the number of streams where the AGC known signal is assigned will differ from the number of streams where data are assigned. Thus, there is a possibility that the gain set by the AGC known signal might not be suitable for the demodulation of data. As a result, the error is likely to occur in the demodulated data.

In order to cope with such problems, when generating training signals, the base station apparatus assigns a channel estimation known signal to a position posterior to an AGC known signal (hereinafter such a stream will be referred to as "main stream"). The base station apparatus provides another stream in a position posterior to this channel estimation known signal (such a stream will be referred to as "sub-stream"), and assigns also a channel estimation known signal to the sub-stream. The base station assigns a data signal to a position posterior thereto in the main stream.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined herein. It is to be noted that the subcarrier number "0" is set to null so as to reduce the effect of a direct current component in a baseband signal. On the other hand, 52 subcarriers, namely, subcarrier numbers "−26" to "26" are defined in a system which is not compatible with a MIMO system (hereinafter referred to as a "legacy system"). One example of legacy systems is a wireless LAN complying with the IEEE802.11a standard. The unit of one signal in the time domain is the unit of one signal composed of a plurality of subcarriers, and this unit will be called "OFDM symbol".

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to 1/2, 3/4 and so forth. The number of data to be transmitted in parallel is set variably. The data are transmitted as packet signals and each of packet signals to be transmitted in parallel is called "stream" as described earlier. As a result thereof, since the mode of modulation scheme and the values of coding rate and the number of streams are set variably, the data rate is also set variably. It is to be noted that the "data rates" may be determined by arbitrary combination of these factors or by one of them. If the modulation scheme is BPSK and the coding rate is 1/2 in a legacy system, the data rate will be 6 Mbps. If, on the other hand, the modulation scheme is BPSK and the coding rate is 3/4, the date rate will be 9 Mbps.

Figure 2:
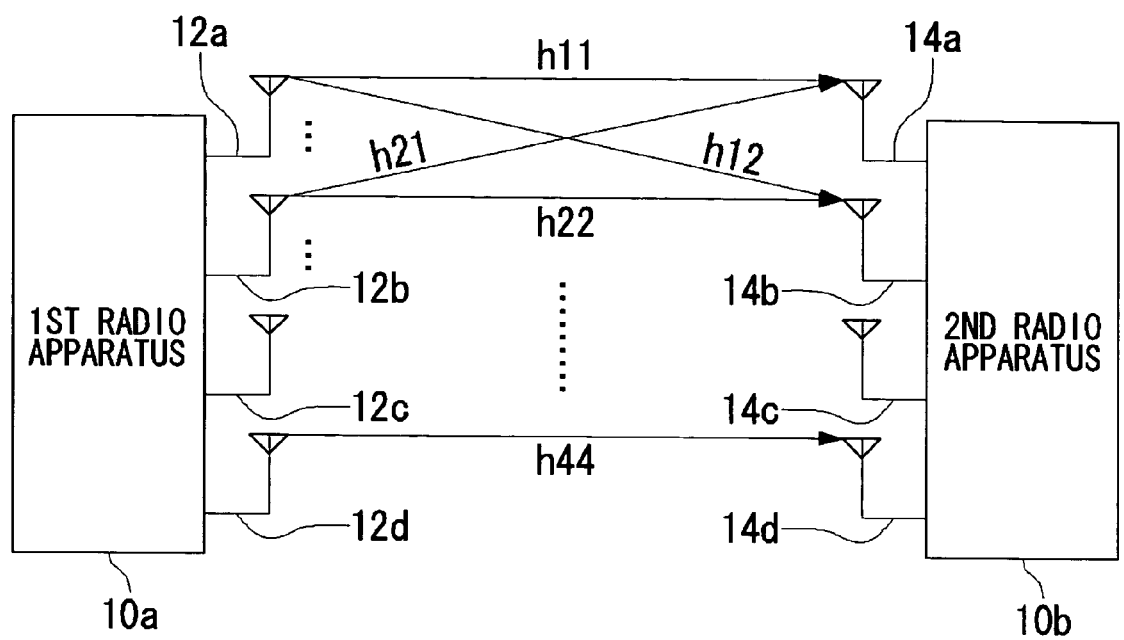
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be described as a structure of the communication system 100. Assume herein that data are being transmitted from the first radio apparatus 10a to the second radio apparatus 10b. The first radio apparatus 10a transmits respectively data of a plurality of streams from the first antenna 12a to fourth antenna 12d, respectively. As a result, the data rate becomes higher. The second radio apparatus 10b receives the data of a plurality of streams by the first antenna 14a to fourth antenna 14d. The second radio apparatus 10b separates the received signals by adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2. Note that the roles of the first radio apparatus 10a and the second radio apparatus 10b may be reversed. It is assumed here that the training signals are transmitted from the first radio apparatus 10a to the second radio apparatus 10b.

Figure 3:
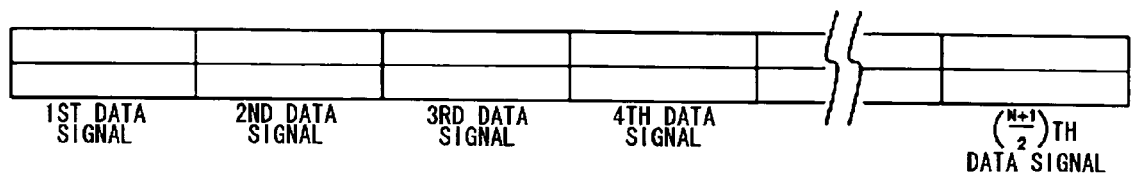
FIG. 3 illustrates a simple overview of the structure of packet signals according to an embodiment of the present invention.

FIG. 3 outlines a structure of a packet signal according to a preferred embodiment of the present invention. FIG. 3 represents a packet signal that is transmitted from a first radio apparatus 10a in FIG. 2, which is a base station apparatus. A plurality of data signals contained in the packet signal are explained here, and the structure of known signals and the like will be explained later. As shown, a packet signal includes a plurality of data signals, namely, "1st Data Signal" to "(N+1)/2-th Data Signal". Each data signal is composed of two streams. "Data Signal" here means a set of data interrelated with each other in a certain sense. The number of streams may be other than "2", but data signals are to be formed by the same number of streams throughout a single packet signal. On the other hand, a plurality of data signals are to be transmitted to their respective terminal apparatuses. A terminal apparatus corresponds to a second radio apparatus 10b of FIG. 2, but may also be any other radio apparatus 10 not shown in FIG. 2.

It is also assumed that a base station apparatus has data rates defined in advance for the transmission of data signals to a plurality of terminal apparatuses. That is, terminal apparatuses transmit information on their respective data rates to the base station apparatus, and the base station apparatus determines the data rates based on the information received. At the base station apparatus, a plurality of data signals are arranged within a packet signal in such a manner that higher data rates are placed in the anterior part thereof and lower data rates in the posterior part thereof. In FIG. 3, therefore, the data rate is higher if closer to the First Data Signal.

It is also assumed that the base station apparatus is in receipt of a signal requesting a transmission of a training signal (hereinafter referred to as "request signal") from a terminal apparatus. A terminal apparatus, for instance, transmits a request signal in order to generate rate information. On the other hand, a base station apparatus, even when it does not receive a request signal, may, on its own initiative, determine a terminal apparatus to which a training signal shall be transmitted. Following a procedure as described above, the base station apparatus specifies terminal apparatuses to which the training signals are to be transmitted.

The base station apparatus selects data signals to be transmitted to the selected terminal apparatuses out of the plurality of data signals. When a selected data signal is the First Data Signal in FIG. 3, the base station apparatus appends a training signal to the First Data Signal. The training signal is added in an anterior part of the First Data Signal. When a selected data signal is the {(N+1)/2}-th Signal in FIG. 3, the base station apparatus adds a training signal to the {(N+1)/2}-th Signal. On the other hand, when a selected data signal is other than those above-mentioned, namely, any of the Second Data Signal to the {((N+1)/2)−1}-th Signal (not shown) in FIG. 3, the base station apparatus moves the selected data signal to a position posterior to the {(N+1)/2}-th Signal. And the base station apparatus appends a training signal to the thus moved data signal.

By the processing as described above, data signals with lower data rates are placed in the rear part of a packet signal, so that the worsening of receiving characteristics due to variation in radio channels can be prevented. A training signal is appended to an anterior part of the data signal of a terminal signal, which transmits the training signal. A training signal is placed either in the foremost part or in the rearmost part of a packet signal. In the former case, known signals and training signals to be added to the packet signal can be shared, so that the drop in transmission efficiency can be prevented. In the latter case, a data signal with a training signal added is placed in the rearmost part of a packet signal, so that a plurality of other data signals are placed in normal order. In other words, known signals are not placed between a plurality of data signals, so that the drop in transmission efficiency can be prevented. Data signals with lower data rates are placed in the rear part of a packet signal, so that the worsening of receiving characteristics can be prevented. Further, a data signal with a training signal added is treated as independent, so that even when the packet signal is long, the drop in the accuracy of channel estimation can be prevented.

Figure 4:
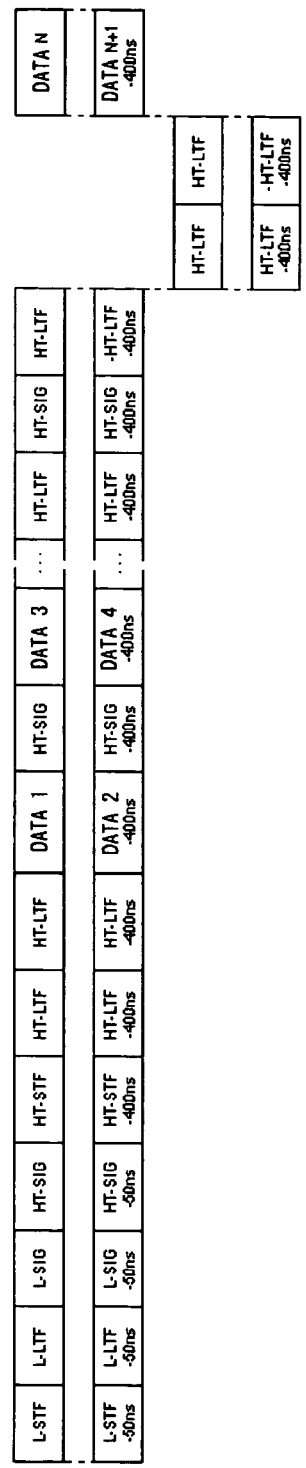
FIG. 4 illustrates packet formats in a communication system shown in FIG. 2.

FIG. 4 illustrates a packet format for a communication system 100. FIG. 4, which is a detailed representation of a packet format shown in FIG. 3, corresponds to a case where the number of data streams is "2". "Data 1" and "Data 2" are both the first data, and the "HT-SIG" signals placed before them are the control signals for the data and contain the address and the like of the destination of the data. These data are equal to the "1st Data Signal" in FIG. 3. "Data 3" and "Data 4" are both the second data, and the "HT-SIG" signals placed immediately before them are the control signals for the data. These data are equal to the "2nd Data Signal" in FIG. 3. Also, "Data N" and "Data N+1" are the (N+1)/2-th data, which are the final data. These data are equal to the "(N+1)/2-th Data Signal" in FIG. 3.

The description of components other than the data shown in FIG. 4, such as "L-STF", will be given later. Here, a training signal is appended to the {(N+1)/2}-th Data Signal. That is, while "HT-LTF" is placed in the main stream where "Data N" and "Data N+1" are placed, "HT-LTF", not shown, is also placed in the sub-stream where "Data N" and "Data N+1" are not placed. "HT-LTF" is equivalent to the aforementioned known signal for use in channel estimation.

FIGS. 5A and 5B are packet formats showing the details of packet formats. The packet formats shown in FIGS. 5A and 5B are not the formats of training signals but those of ordinary packet signals. FIGS. 5A and 5B show data signals assigned to the header of FIG. 3 or FIG. 4, namely, "First Data Signal" and a known signal appended thereto. Here, FIG. 5A represents a case where the number of streams is "4", and FIG. 5B a case where the number of streams is "2". In FIG. 5A, it is assumed that data contained in four streams are to be transmitted, and packet formats corresponding to the first to fourth streams are shown in order from top to bottom.

In the packet signal corresponding to the first stream, "L-STF", "HT-LTF" and the like are assigned as preamble signals. "L-STF", "L-LTF", "L-SIG", and "HT-SIG" are a known signal for AGC setting, a known signal for channel estimation and a control signal compatible with legacy system, and a control signal compatible with MIMO system, respectively. The control signal compatible with MIMO system, for example, contains information on the number of streams and a destination of data. "HT-STF" and "HT-LTF" are a known signal for AGC setting and a known signal, for channel estimation, compatible with a MIMO system, respectively. On the other hand, "DATA 1" is a data signal. Note that L-LTF and HT-LTF are used not only for AGC setting but also for timing estimation.

In the packet signal corresponding to the second stream, "L-STF(−50 ns)", "HT-LTF(−400 ns)" and the like are assigned as preamble signals. And, in the packet signal corresponding to the third stream, "L-STF(−100 ns)", "HT-LTF(−200 ns)" and the like are assigned as preamble signals. And, in the packet signal corresponding to the fourth stream, "L-STF(−150 ns)", "HT-LTF(−600 ns)" and the like are assigned as preamble signals.

Here, "−400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out from the rearmost part in the predetermined interval is assigned cyclically in a header portion of the predetermined interval. That is, "L-STF(−50 ns)" is "L-STF" given a cyclic timing shift by a delay of −50 ns. Note that L-STF and HT-STF are each structured by a repetition of an 800 ns duration and that the other parts such as HT-LTF and the like are each constituted by a repetition of a 3.2 μs duration. It is also to be noted that "DATA 1" to "DATA 4" are also subjected to CDD and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+fourth component" for received signals of all the streams. The receiving apparatus extracts a desired signal for the fourth stream by computing "first component +second component−third component−fourth component" for received signals of all the streams. Note that the addition and subtraction processing is done by vector operation.

As with a legacy system, "52" subcarriers are used for the part from "L-LTF" to "HT-SIG" and so forth. Note that "4" subcarriers out of the "52" subcarriers correspond to pilot signals. On the other hand, the part of "HT-LTF" or the like and thereafter uses "56" subcarriers.

FIG. 5B is similar to the first stream and second stream of the packet formats shown in FIG. 5A. Here, the assignment of "HT-LTFs" in FIG. 5B differs from that of "HT-LTFs" in FIG. 5A. That is, there are only the first components and the second components of HT-LTFs. In the first stream, HT-LTFs are assigned in the order of "HT-LTF" and "HT-LTF" from the top, whereas in the second stream they are assigned in the order of "HT-LTF" and "−HT-LTF". A receiving apparatus extracts a desired signal for the first stream by computing "first component+second component" for received signals of all the streams. Also, the receiving apparatus extracts a desired signal for the second stream by computing "first component−second component" for received signals of all the streams.

Figure 6A:
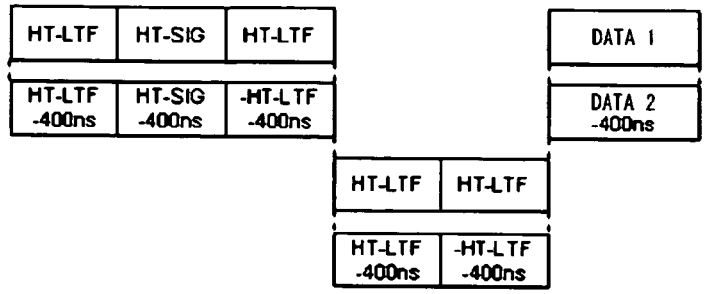
FIGS. 6A to 6D illustrate packet formats depicted in more detail over those shown in FIG. 4.
Figure 6B:
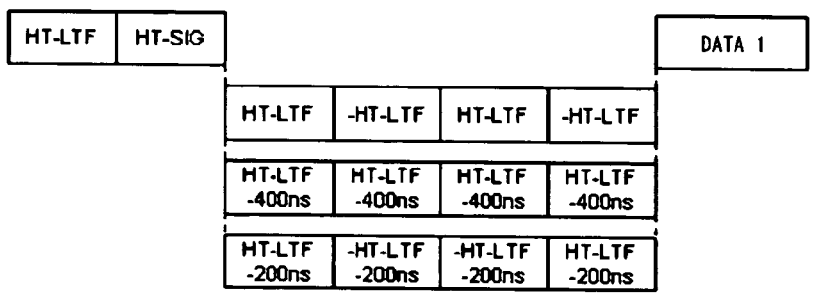
Figure 6C:
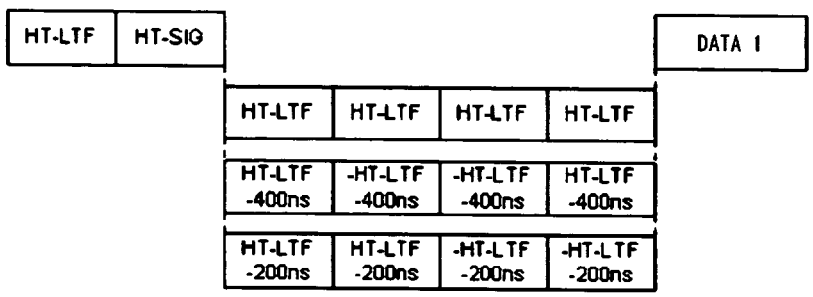
Figure 6D:
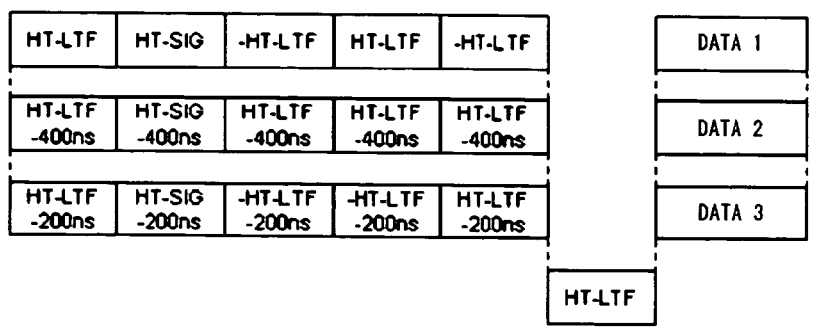

FIGS. 6A to 6D are packet formats showing the details of packet formats. FIGS. 6A to 6D are training signals. Accordingly, those shown in FIGS. 6A to 6D are appended to the {(N+1)/2}-th data signal of FIG. 3. Those shown in FIGS. 6A to 6D are appended to the positions anterior to Data N and Data N+1. FIG. 6A is the case when the number of main streams in which data signals are assigned is "2"; FIGS. 6B and 6C are the case when the number of main streams is "1"; and FIG. 6D is the case when the number of main streams is "3". In other words, in FIG. 6A the data signals are assigned in the first and the second stream; in FIGS. 6B and 6C the data signal is assigned in the first stream; and in FIG. 6D the data signals are assigned in the first to the third stream.

In the first stream of FIG. 6A, the same two "HT-LTFs" and the like as in FIG. 5B are assigned. However, "HT-SIG" is assigned between the first "HT-LTF" and the second "HT-LTF". In the second stream, the signals obtained as a result of the CDD of "−400 ns" applied to the first stream are assigned. In a position posterior thereto, a blank duration is provided in the first stream and the second stream. In the third and fourth streams, on the other hand, HT-LTFs are assigned to the position corresponding to the blank duration in the first and second streams. And, following the HT-LTFs assigned to the third and fourth streams, data are assigned to the first and second streams. The arrangement of HT-LTFs in the third stream and the fourth stream are the same as that of FIG. 5B.

The assignment as described above makes the number of streams to which "HT-STF" of FIG. 5B is assigned equal to the number of streams to which a data signal is assigned, so that the error contained in the gain set by "HT-STF" becomes small at a receiving apparatus, thus preventing the worsening of data signal receiving characteristics. Also, since the "HT-LTFs" assigned to the third and fourth streams are only assigned to these two streams, the error contained in the gain set by "HT-STF" becomes small at a receiving apparatus, thus preventing a drop in the accuracy of channel estimation.

Here it is assumed that the degrees of priority for the amounts of timing shift are defined in the descending order of "0 ns", "−400 ns", "−200 ns" and "−600 ns". In other words, "0 ns" has the highest degree of priority, and "−600 ns" the lowest. Accordingly, the values of "0 ns" and "−400 ns" are used as timing shift amounts in the first stream and the second stream, respectively. In the third stream and the fourth stream, the values of "0 ns" and "−400 ns" are also used as timing shift amounts, respectively. As a result, the combination of "HT-LTF" and "HT-LTF" in the first stream is also used in the third stream, and the combination of "HT-LTF(−400 ns)" and "−HT-LTF(−400 ns)" in the second stream is also used in the fourth stream, thus making the processing simpler.

In the first stream of FIG. 6B, "HT-LTF" is assigned to one position only. In a position posterior thereto, however, a blank duration is provided in the first stream. In the second to fourth streams, on the other hand, HT-LTFs are assigned to the positions corresponding to the blank duration in the first stream. And, following the HT-LTFs assigned to the second to fourth streams, data is assigned to the first stream. Here, the arrangement of HT-LTFs assigned to the second and the third stream is similar to that in FIG. 5A.

The packet format of FIG. 6C is structured the same way as for that of FIG. 6B. However, the combination of the signs of "HT-LTF" in FIG. 6C differs from that in FIG. 6B. Here, the combination of the signs of "HT-LTFs" is so defined that an orthogonal relationship holds among the streams. Furthermore, in FIG. 6C, the combination of the signs of "HT-LTFs" is so defined as to be fixed for each of a plurality of streams. Similar to FIG. 6B, "0 ns", "−400 ns" and "−200 ns", which have higher degrees of priority, are used even in the second to fourth streams in FIG. 6C.

The arrangement up to HT-LTFs in the first to the third stream of FIG. 6D corresponds to a modified arrangement over FIG. 5A. In a position posterior thereto, a blank duration is provided in the first to the third stream. One "HT-LTF" is assigned to a fourth period corresponding to the blank durations in the first to third streams. And, following the HT-LTF assigned to the fourth stream, data are assigned to the first to third streams. According to the above-described degree of priority, the amount of timing shift for HT-LTF assigned to the fourth stream is set to "0 ns".

Two "HT-LTFs" are assigned to the third and the fourth stream, namely, the sub-streams in FIG. 6A. Four "HT-LTFs" are assigned to the second and the fourth stream, namely, the sub-streams in FIG. 6B and FIG. 6C. One "HT-LTF" is assigned to the fourth stream, namely, the sub-stream in FIG. 6D. Comparing these, it is found that the length of "HT-LTF" assigned to the sub-stream in FIG. 6D is the shortest. That is, as the number of main streams in packet signal where training signals are to be produced increases, the length of sub-stream will decrease.

FIG. 7A to 7D illustrate another packet formats in FIG. 6A to 6D. FIGS. 7A to 7D correspond to FIGS. 6A to 6D, respectively. In FIGS. 7A to 7D, the amounts of timing shift are defined by associating them with a plurality of streams. Here, the timing shift amount of "0 ns" is defined for the first stream, the timing shift amount of "−400 ns" for the second stream, the timing shift amount of "−200 ns" for third second stream, and the timing shift amount of "−600 ns" for the fourth stream. Accordingly, the timing shift amounts of "−200 ns" and "−600 ns" are used in FIG. 7A, instead of the timing shift amounts of "0 ns" and "−400 ns" in the third and the fourth stream in FIG. 6A. On the other hand, the timing shift amounts of "−400 ns", "−200 ns" and "−600 ns" are used in FIGS. 7B and 7C, instead of the timing shift amounts of "0 ns", "−400 ns" and "−200 ns" in the second to the fourth stream in FIGS. 6B and 6C. The timing shift amount of "−600 ns" is used in FIG. 7D, instead of the timing shift amount of "0 ns" in the fourth stream in FIG. 6D.

Figure 7A:
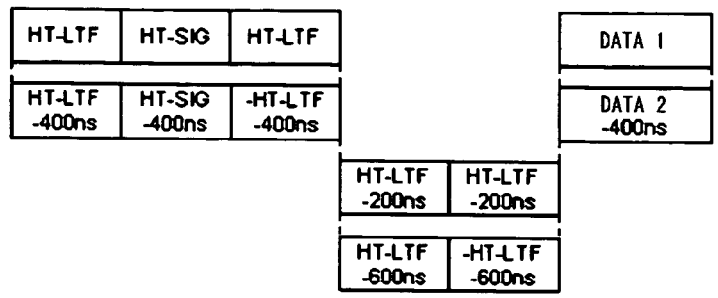
FIGS. 7A to 7D illustrate another mode of packet formats shown in FIGS. 6A to 6D.
Figure 7B:
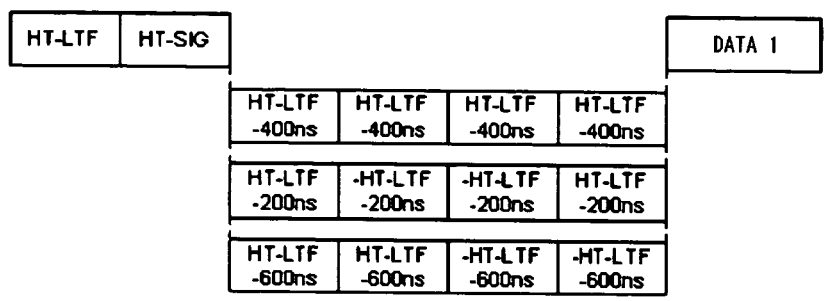
Figure 7C:
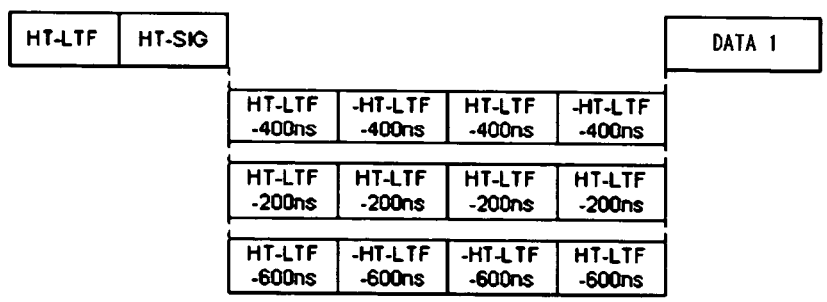
Figure 7D:
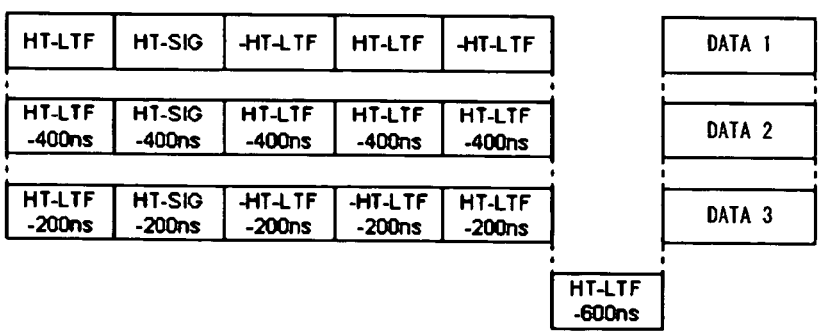

The packet format of FIG. 7C is structured the same way as for that of FIG. 7B. However, the combination of the signs of "HT-LTF" in FIG. 7C differs from that in FIG. 7B. The combinations of the signs of "HT-LTF" are given degrees of priority beforehand. That is, the degrees of priority are so defined that the combination of signs in the first stream of FIG. 5A has the highest degree of priority and that in the fourth stream thereof the lowest. For streams to which a data signal is assigned, the combinations of signs are used in order from one with the highest degree of priority, and also for streams to which a data signal is not assigned, the combinations of signs are used in order from one with the highest degree of priority. In this manner, the combinations of signs are set the same way as for the both cases. Hence, when the receiving apparatus retrieves the respective components by performing + (plus) and − (minus) operations, a common circuit can be used in both of the calculation of channel characteristics for the part of "HT-LTF" in streams to which Data is not assigned and the calculation of channel characteristics for the part of "HT-LTF" in streams to which Data is assigned.

FIG. 8 shows packet formats of a packet signal that is finally transmitted in the communication system 100. FIG. 8 corresponds to a modified version of a packet signal of FIG. 6D or FIG. 7D. An operation by orthogonal matrix to be explained later is carried out up to "HT-STF" and "HT-LTF", which are assigned to the first to third streams shown in FIG. 6D or FIG. 7D. As a result, "HT-STF1" to "HT-STF4" are generated. The same applies to other "HT-LTFs" as well. Furthermore, CDD is applied to each of the first to fourth streams by their respective timing shift amounts of "0 ns", "−50 ns", "−100 ns" and "−150 ns". Note that the absolute value of timing shift amount in the second CDD is so set as to be smaller than the absolute value of timing shift amount in the first CDD applied to HT-LTF. A similar processing is performed on "HT-LTF" assigned to the fourth stream and "DATA 1" and the like assigned to the first to third streams.

Figure 9:
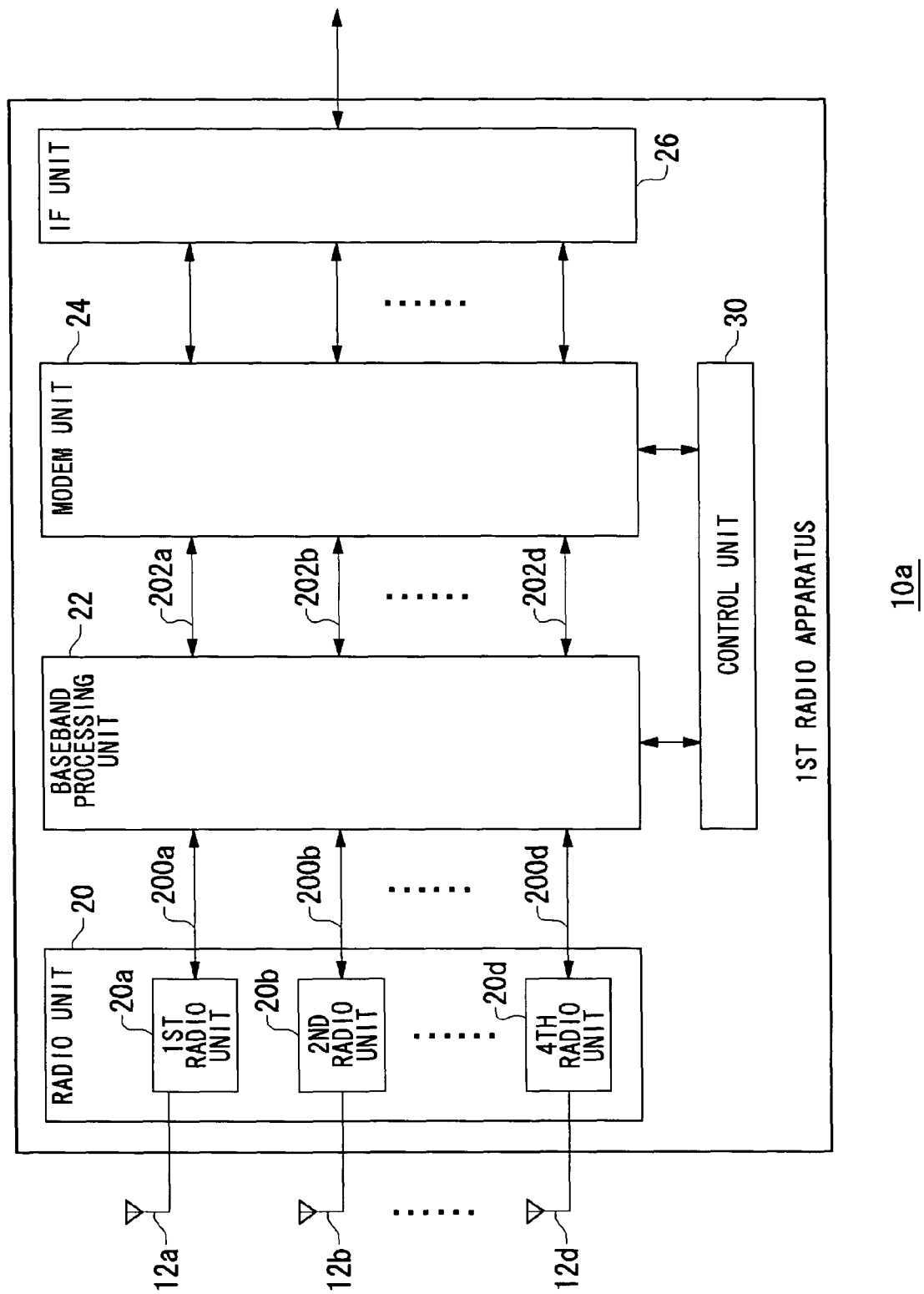
FIG. 9 illustrates a structure of a first radio apparatus shown in FIG. 2.

FIG. 9 illustrates a structure of a first radio apparatus 10a. The first radio apparatus 10a includes a first radio unit 20a, a second radio unit 20b, . . . and a fourth radio unit 24d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a. Accordingly, in the following description, the description on the receiving operation corresponds to the processing by the second radio apparatus 10b, whereas the description on the transmission operation corresponds to the processing by the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included. The AGC unit sets gain in "L-STF" and "HT-STF".

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. That is, the radio unit 20 transmits radio-frequency packet signals from the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 10:
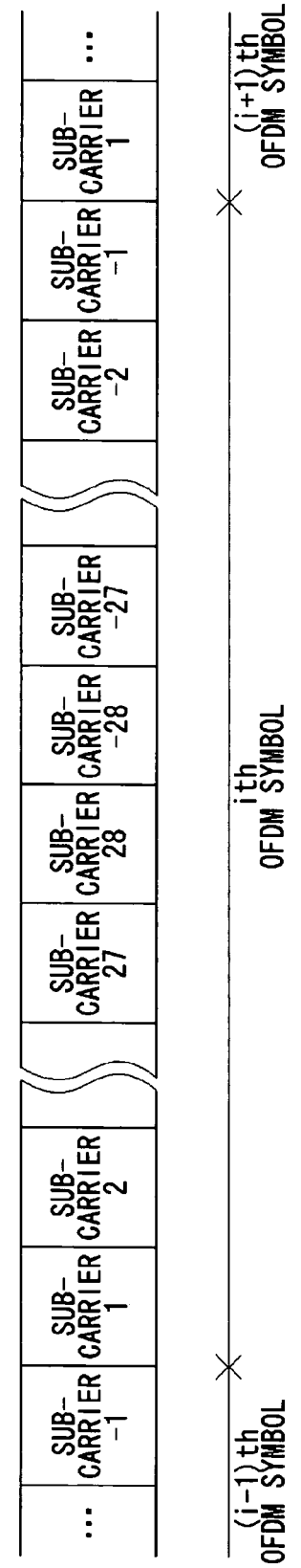
FIG. 10 illustrates a structure of a frequency-domain signal shown in FIG. 9.

FIG. 10 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in "L-SIG" or the like, a combination of "−26" to "26" is used for one "OFDM symbol".

Now refer back to FIG. 9. To produce the packet formats corresponding to FIG. 4, FIGS. 5A and 5B, FIGS. 6A to 6D and FIGS. 7A to 7D, the baseband processing unit 22 carries out CDD. The baseband processing unit 22 performs the multiplication of a steering matrix to achieve the deformed or modified packet format as shown in FIG. 8. Such processing will be discussed later.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30. Here, an example of the coding is convolutional coding, whereas an example of decoding is Viterbi decoding.

The control unit 30 controls the timing and the like of the first radio apparatus 10a. The control unit 30 performs processing on the IF unit 26, the modem unit 24 and the baseband processing unit 22 to transmit the packet signals shown in FIG. 3 to FIG. 8. The IF unit 26 receives the input of a plurality of data signals each of which is composed of at least one stream. For simplicity of explanation, it is assumed here that the destinations of a plurality of data to be sent are different terminal apparatuses. Also, it is assumed that the control unit 30 has received beforehand a request signal through the radio unit, the baseband processing unit 22 and the modem unit 24. The control unit 30 identifies a terminal apparatus corresponding to the thus received request signal. By carrying out the above processing, the control unit 30 specifies the terminal apparatuses to which the training signal is to be transmitted, among the terminal apparatus to which the inputted plurality of data are to be transmitted.

The control unit 30 assigns a plurality of data signals in a manner that, among the plurality of inputted data signals, a data signal of a higher data rate is assigned to an anterior part of packet signal, so as to generate packet signals. In so doing, a data signal of a higher data rate is assigned to a front part of packet signal whereas a data signal of a lower data rate is assigned toward a posterior part of packet signal.

When a data signal which is to be transmitted to the specified terminal apparatus is contained in an anterior part of the packet signal, for example, when it is the First Data Signal of FIG. 3, the control unit 30 appends a training signal to a position anterior to the First Data Signal. In the training signal of this arrangement, a blank period is provided between "HT-LTF" and "Data 1" in the first and the second stream of FIG. 5B. In this blank period, "HT-LTF" and the like in the third and the fourth stream of FIG. 6A or FIG. 7A are assigned to the third and the fourth stream. When generating the packet signals, the control unit 30 appends HT-SIGs, indicating the terminal apparatuses to which data signals are to be transmitted, to a plurality of data signals, respectively.

When the data signal which is to be transmitted to the specified terminal apparatus is not contained in an anterior part of the packet signal, said data signal is moved to a posterior part of packet signal. This is equivalent to moving the specified data signal to a position posterior to the {(N+1)/2}-th data signal of FIG. 3. Further, the control unit 30 appends a training signal to a position anterior to the moved data signal. The training signals in this arrangement corresponds to those in FIGS. 6A to 6D and FIGS. 7A to 7D. Also, the control unit 30 appends the known signals, whose number of streams corresponds to the number of streams for data signals, to a position anterior to the First Data Signal. This arrangement corresponds to FIGS. 5A and 5B.

Note that the control unit 30 may specify the terminal apparatuses by using another method different from the above described. For example, the control unit 30 specifies a terminal apparatus which has not received the information on data rate over a certain period of time. That is, the terminal apparatuses storing the obsolete rate information in the control unit 30 are identified. In order to execute this, the control unit 30 is equipped with a timer. Furthermore, when the training signal is to be appended to a position anterior to the data which shall be transmitted to the specified terminal apparatus, a request indicating that the rate information needs to be transmitted is also appended to a position anterior to said data.

The control unit 30 produces packet signals structured by a plurality of streams as shown in FIG. 3, FIG. 4, FIGS. 5A and 5B, FIGS. 6A to 6D, FIGS. 7A to 7D and FIG. 8 in cooperation with the IF unit 26, the modem unit 24 and the baseband processing unit 22. Though a description is given here centering around the processing for producing the packet signals shown in FIGS. 6A to 6D and FIGS. 7A to 7D, the relevant part thereof may be executed for producing the packet signals shown in FIGS. 5A and 5B.

The control unit 30 instructs the baseband processing unit 22 to assign HT-LTF and Data to a main stream in the specified packet signal. This corresponds to the arrangement in the main streams in FIGS. 6A to 6D and FIGS. 7A to 7D. The main streams correspond to the first to the third stream in FIG. 6D, for instance. While setting sub-streams, the control unit 30 assigns HT-LTFs to the sub-streams. Here, the control unit 30 assigns HT-LTF to the timing other than the timing to which HT-LTFs and Data in the main streams are assigned. This corresponds to the arrangement in the sub-streams in FIGS. 6A to 6D and FIGS. 7A to 7D. A sub-stream corresponds to the fourth stream in FIG. 6D, for instance.

For a leading data signal in the unspecified data signals, the control unit 30 assigns HT-LTF to at least one stream. This corresponds to the arrangement in FIGS. 5A and 5B the control unit 30 has the baseband processing unit 22 apply CDD to HT-LTFs and the like assigned to the main streams. Note that the CDD is equivalent to applying a cyclic timing shift within HT-LTF to HT-LTF assigned to the other streams, using HT-LTF assigned to a stream as a reference. The control unit 30 also applies CDD to HT-LTF assigned to sub-streams. The control unit 30 sets beforehand the degrees of priority for the amounts of timing shift. Here, as described above, "0 ns" has the highest degree of priority, and following this, the degrees of priority are set in descending order of "–400 ns", "–200 ns" and "–600 ns"

The control unit 30 has the baseband processing unit 22 use the amounts of timing shift for the main streams in order from one with the highest degree of priority. For example, in the case of FIG. 6D, "0 ns" is used for the first stream, "–400 ns" is used for the second stream, and "–200 ns" is used for the third stream. The control unit 30 has the baseband processing unit 22 use the amount of timing shift also for the sub-streams in order from one with the hightes degree of priority. For example, in the case of FIG. 6D, "0 ns" is used for the fourth stream. The control unit 30 has the baseband processing unit 22 apply CDD to Data, too. And the control unit 30 unit 30 has it use the amount of timing shift for the main streams, as the timing shift amount for Data. By employing the above-described processing, the packet signals having packet formats as shown in FIGS. 6A to 6D are produced.

On the other hand, aside from this, different vales of timing shift amounts may be set to a plurality of streams, respectively. For example, "0 ns" is set as the timing shift amount for the first stream, "–400 ns" is set as the timing shift amount for the second stream, "–200 ns" is set as the timing shift amount for the third stream, and "–600 ns" is set as the timing shift amount for the fourth stream. By executing this processing, the packet signals having packet formats as shown in FIGS. 7A to 7D are produced.

After the packet signals having packet formats as shown in FIGS. 6A to 6D and FIGS. 7A to 7D have been produced by executing the above-described processings, the control unit 30 has the baseband processing 22 deform or modify these packet signals and has it send the deformed packet signals to the radio unit 20. That is, the control unit 30 deforms or modifies the packet formats shown in FIGS. 6A to 6D and FIGS. 7A to 7D into the packet formats shown in FIG. 8. After extending the number of main streams to the number of a plurality of streams, the baseband processing unit 22 applies CDD to the extended streams. Also, after extending the number of sub-streams to the number of a plurality of streams, the baseband processing unit 22 applies CDD to the extended sub-streams. Here, the control unit 30 sets values of timing shift in a manner such that the timing shift amounts for the main streams are equal to those for the other main streams.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 11:
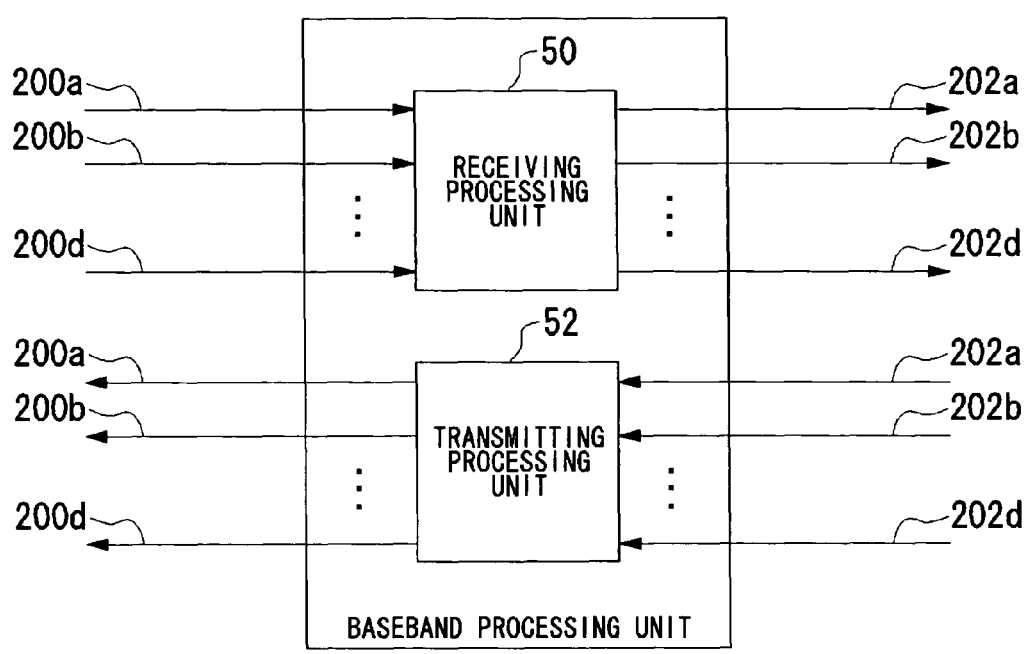
FIG. 11 illustrates a structure of a baseband processing unit shown in FIG. 9.

FIG. 11 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202. It is to be noted here that the receiving processing unit 50 may generate rate information based on the frequency-domain signals 202. As for the generation of rate information, a known technique serves the purpose as mentioned above and the explanation thereof is omitted here.

The transmitting processing unit 52 executes a part, corresponding to a transmission operation, of operations by the baseband processing unit 22. That is, the transmitting processing unit 52 converts the frequency-domain signal 202 so as to generate the time-domain signal 200. The transmitting processing unit 52 associates a plurality of streams with a plurality of antennas 12, respectively. The transmitting processing unit 52 applies CDD as shown in FIGS. 6A to 6D and FIGS. 7A to 7D, and executes an operation using a steering matrix. The transmitting processing unit 52 outputs finally the time-domain signals 200. On the other hand, the transmitting processing unit 52 may execute beamforming when transmitting the packet signals as shown in FIGS. 6A to 6D and FIGS. 7A to 7D. As for the beamforming, a known technique serves the purpose as mentioned above and the explanation thereof is omitted here.

Figure 12:
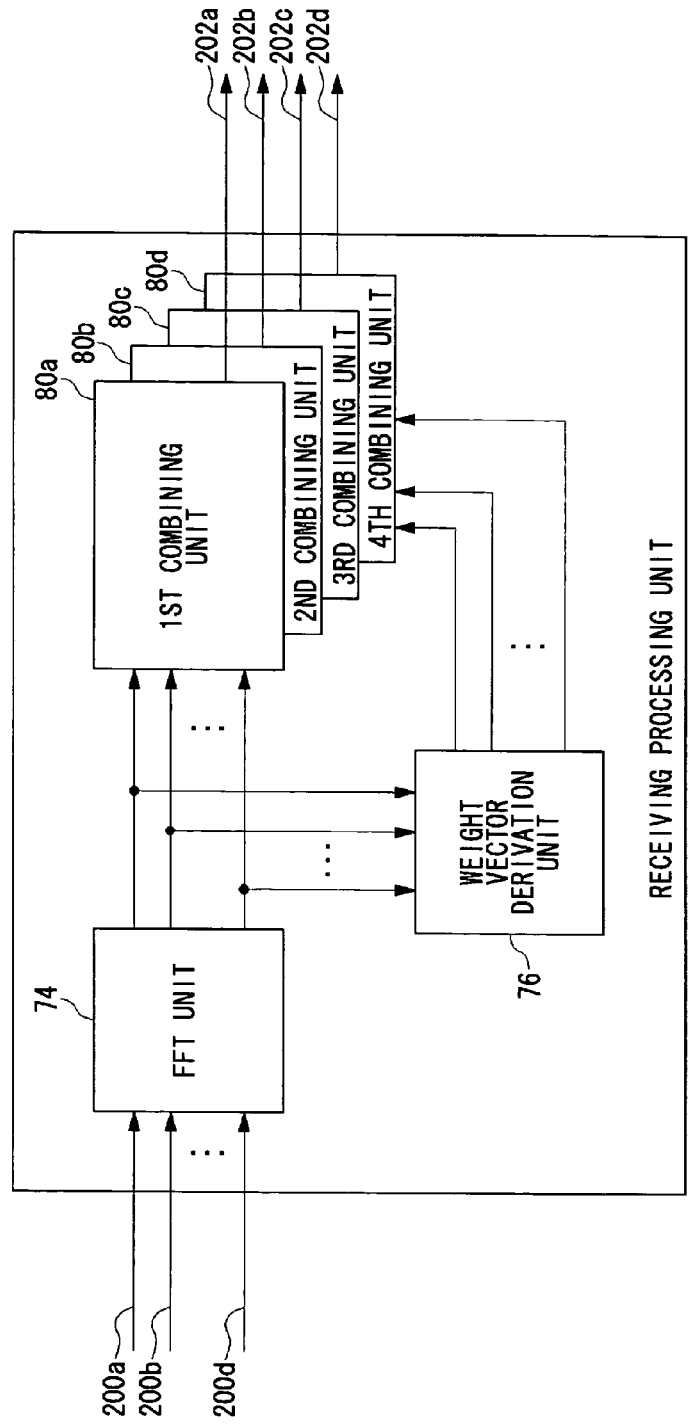
FIG. 12 illustrates a structure of a receiving processing unit shown in FIG. 11.

FIG. 12 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 10. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used in deriving a weight vector corresponding to each of a plurality of streams. To derive the weight vector, an adaptive algorithm may be used or channel characteristics may be used. Since a known technique may be employed in the processing for the adaptive algorithm and so forth, the explanation thereof is omitted here. When deriving the weight vector, the weight vector derivation unit 76 executes an operation of the first component minus (−) the second component plus (+) the third component minus (−) the fourth component or the like, as described earlier. As also described above, the weights are derived finally for each of subcarriers, antennas 12 and streams, respectively.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplication is to be executed, a value corresponding to one subcarrier is selected from among the frequency-domain values converted by the FFT unit 74. The selected value contains a value corresponding to each antenna 12. Note that both the selected weight and the selected value belong to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 13:
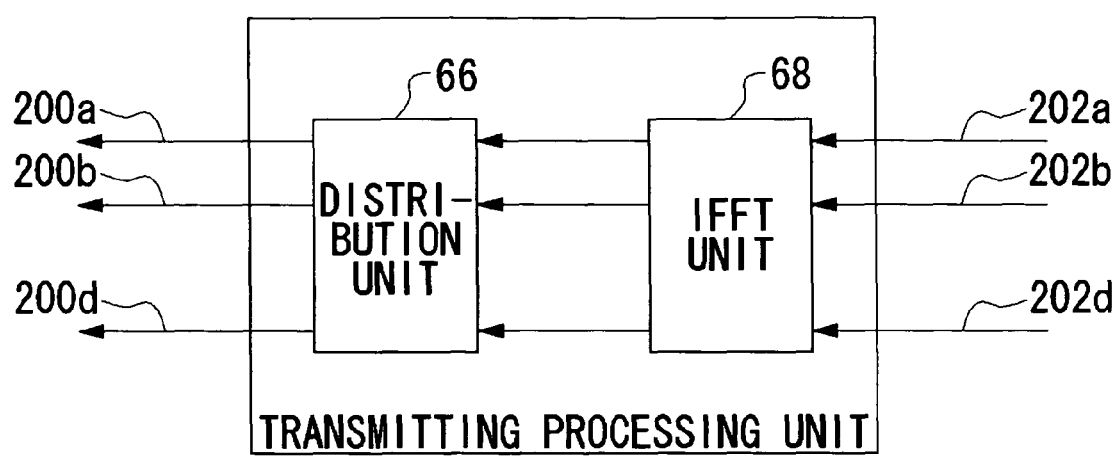
FIG. 13 illustrates a structure of a transmitting processing unit shown in FIG. 11.

FIG. 13 illustrates a structure of the transmitting processing unit 52. The transmitting processing unit 52 includes a distribution unit 66 and an IFFT unit 68. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. To produce the packet signals corresponding to FIG. 4, FIGS. 5A and 5B, FIGS. 6A to 6D and FIGS. 7A to 7D, the distribution unit 66 carries out CDD. CDD is expressed as a matrix C in the following Equation (1).

$$C(\lambda)=diag(1, \exp(-j2\pi\lambda\delta/Nout), \Lambda, \exp(-j2\pi\lambda\delta(Nout-1)/Nout)) \quad (1)$$

where δ indicates a shift amount and λ a subcarrier number. The multiplication of the matrix C by a stream is done on a subcarrier-by-subcarrier basis. That is, the distribution unit 66 carries out a cyclic time shifting within the L-STF and so forth per stream. The amount of timing shift is so set as shown in FIG. 4, FIGS. 5A and 5B, FIGS. 6A to 6D and FIGS. 7A to 7D.

The distribution unit 66 may multiply respectively the training signals produced, as in FIGS. 6A to 6D and FIGS. 7A to 7D, by a steering matrix so as to increase the number of streams for training signal up to the number of a plurality of streams. Before carrying out multiplication, the distribution unit 66 extends the degree of inputted signals to the number of a plurality of streams. Since "HT-STF" and the like are assigned to the first to the third stream in the case of FIG. 6D and FIG. 7D, the number of signals inputted is "3" and this will be represented by "Nin" here. Accordingly, the inputted data are indicated by a vector of "Nin×1". The number of a plurality of streams is "4" and this is represented by "Nout" here. The distribution unit 66 extends the degree of inputted data to Nout from Nin. In other words, the vector of "Nin×1" is extended to the vector of "Nout×1". In so doing, "0" is inserted to components from the (Nin+1)th row to the Nout-th row. On the other hand, the component up to Nin are "0's" for "HT-LTF" assigned to the fourth stream of FIG. 6D and FIG. 7D, and HT-LTF and the like are inserted to the components from (Nin+1)th row to the Nout-th row A steering matrix is expressed by the following Equation (2).

$$S(\lambda)=C(\lambda)W \quad (2)$$

The steering matrix is a matrix of "Nout×Nout". W is an orthogonal matrix of "Nout×Nout". An example of the orthogonal matrices is a Walsh Matrix. Here, λ is the subcarrier number, and the multiplication by a steering matrix is done on a subcarreri-by-subcarrier basis. C denotes CDD as described above. Here, the amounts of timing shift are so defined as to differ for a plurality of streams, respectively. That is, the amounts of timing shift for the first to the fourth stream are defined to be, for example, "0 ns", "−50 ns" "−100 ns" and "−150 ns", respectively.

Figure 14:
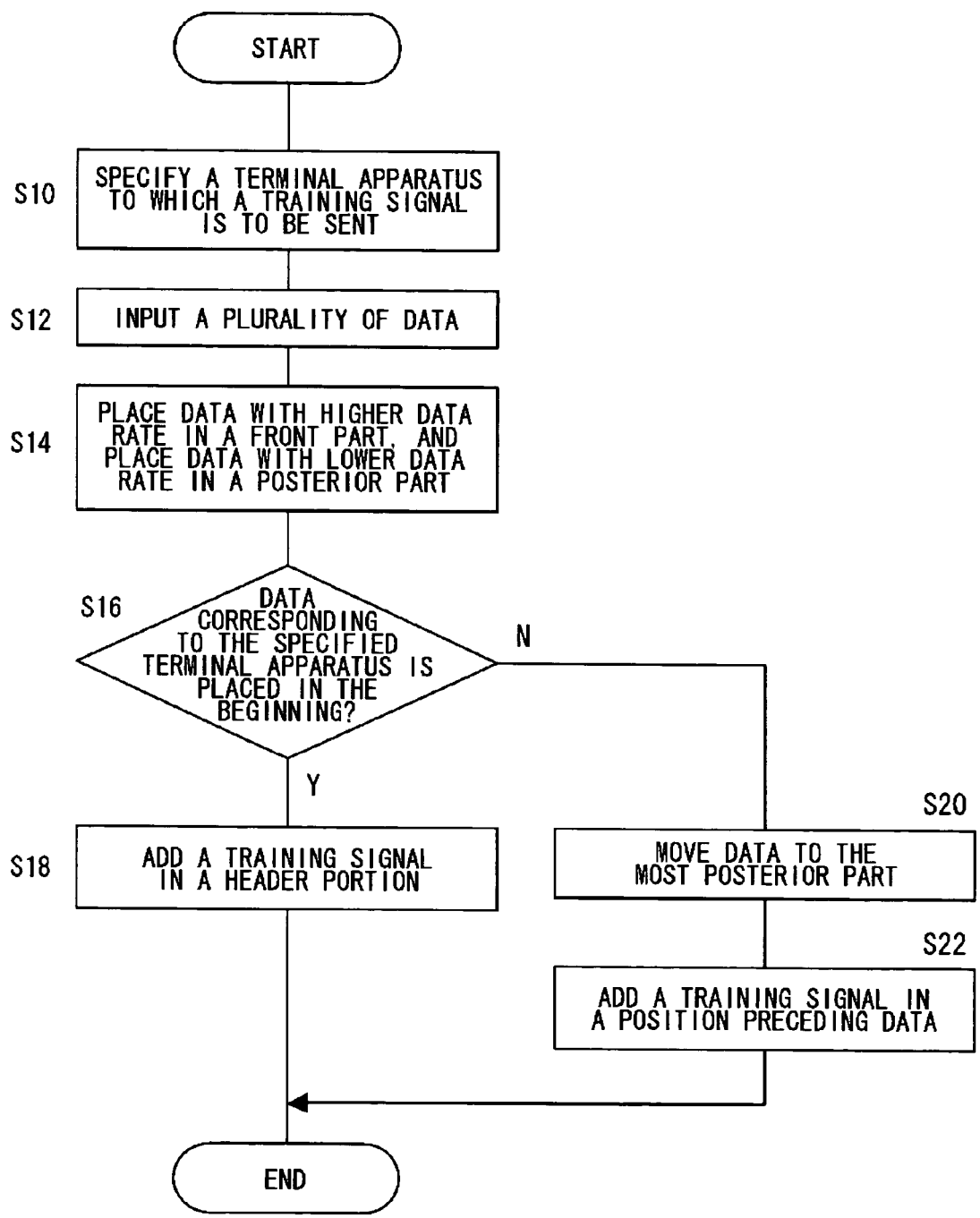
FIG. 14 is a flowchart showing a procedure of transmission processing at a first radio apparatus shown in FIG. 9.

An operation of the first radio apparatus 10 as structured above will now be described. FIG. 14 is a flowchart showing a procedure of transmission processing at a first radio apparatus 10a. A control unit 30 specifies a terminal apparatus to which training signals are to be transmitted (S10). An IF unit 26 inputs a plurality of data (S12). The control unit 30 places data with higher data rates in the anterior parts of a packet signal and places data with lower data rates in the posterior parts thereof (S14). If the data for the specified terminal apparatus is placed in the foremost part (Y of S16), the control unit 30 appends a training signal to the foremost part for a baseband processing unit 22 (S18). On the other hand, if the data for the specified terminal apparatus is not placed in the foremost part (N of S16), the control unit 30 moves the data to the rearmost part of the packet signal (S20). Further, the control unit 30 appends a training signal to an anterior part of the data (S22).

According to the embodiments of the present invention, the data for terminal apparatuses requiring lower data rates are placed in rear parts of a packet signal, so that the worsening of receiving characteristics can be prevented. A terminal apparatus derives the weights only in the foremost part of a packet signal, and the data for terminal apparatuses requiring lower data rates are placed in rear parts of a packet signal even when errors contained in the weight increase in the rear part, so that the effects of errors contained in the weights can be prevented. And the thus prevented effects of errors contained in the weight may lead to a controlled degradation of receiving characteristics. A terminal apparatus derives weights only in the foremost part of a packet signal, so that the amount of processing at the terminal apparatus can be reduced. And the thus reduced the amount of processing at the terminal apparatus can reduce the power consumption at the terminal apparatus. The data for a plurality of terminal apparatuses are included in a single packet signal, so that the transmission efficiency can be improved.

Moreover, if data for a terminal apparatus to which a training signal is to be transmitted are in the foremost part of a packet signal, then a training signal is placed in the foremost part of the packet signal, so that the known signals and training signal for the packet signal can be shared. And the sharing of the known signals and training signal for the packet signal can lead to an improved utilization efficiency. If data for terminal apparatuses to which a training signal is to be transmitted are not placed in the foremost part of a packet signal, then the data are moved to the rearmost part of the packet signal, so that data can be placed consecutively without adding a training signal. And the consecutive placement of data can lead to an improved utilization efficiency. Since a training signal is appended to the moved data, an independent processing can be executed. And the independent processing thus executed can lead to an improved accuracy in the estimation of channel characteristics. Since the raining signal is placed in the rearmost part of a packet signal, it is possible to have the latest channel characteristics estimated even when there is variation in radio channels. And the latest channel characteristics thus estimated can result in an improved accuracy in channel estimation.

Since the timing shift amounts for the respective HT-LTFs assigned to a plurality of streams are of the same values, a receiving apparatus can cope easily when there are changes in streams that have data assigned. Since different timing shift amounts are set for a plurality of streams, respectively, the processing can be carried out uniformly. Moreover, such a uniformly performed processing makes the processing simpler. Even when the number of streams where data is assigned increases in the subsequent packet signal, the HT-LTF for the stream to have the increase thereof has already been transmitted with the same timing shift amount, so that the receiving apparatus can use the already derived timing and the like. Since it can use the already derived timing and the like, the receiving apparatus can easily cope with the increase in the number of streams where data is assigned.

More of the same timing shift amounts can be used by defining the degrees of priority for the timing shift amounts and using the timing shift amounts in order from one with the highest degree of priority for both the stream where data is assigned and the stream where data is not assigned. Moreover, the processing may be made simpler by using more of the same timing shift amounts. Further, when the number of a plurality of streams is "2" and the number of streams to which data is assigned is "1", a receiving apparatus may instruct a transmitting apparatus which of the plurality of streams is to have data assigned, according to the receiving condition of HT-LTF. In other words, it is possible to execute transmission diversity.

Since the timing shift amounts for the respective HT-LTFs assigned to a plurality of streams are of the same values, a receiving apparatus can cope easily when there are changes in streams that have data assigned. Since different timing shift amounts are set for a plurality of streams, respectively, the processing can be carried out uniformly. Moreover, such a uniformly performed processing makes the processing simpler. Even when the number of streams where data is assigned increases in the subsequent packet signal, the HT-LTF for the stream to have the increase thereof has already been transmitted with the same timing shift amount, so that the receiving apparatus can use the already derived timing and the like. Since it can use the already derived timing and the like, the receiving apparatus can easily cope with the increase in the number of streams where data is assigned.

The present invention has been described based on the embodiments which are only exemplary. It is therefore understood by those skilled in the art that other various modifications to the combination of each component and process are possible and that such modifications are also within the scope of the present invention.

According to the embodiments of the present invention, the description has been given of a case when the number of multistreams is "4". However, the present invention is not limited thereto and, for example, the number of a plurality of streams may be less than "4" or may be greater than "4". Along with this example, the number of antennas 12 may be less than "4" in the former case and may be greater than 4" in the latter case. According to this modification, the present invention can be applied to a variety of the number of streams.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus, comprising:
    an interface which inputs a plurality of data signals to be transmitted in parallel from a plurality of antennas, each data signal being assigned to at least one stream;
    a generator which generates a packet signal by arranging the plurality of data signals in a manner that, among the plurality of data signals inputted in said interface, a data signal of a higher data rate is assigned in an anterior part, the packet signal comprising training signals to be assigned to M streams, respectively and the data signals to be assigned to N of M streams, respectively, wherein N and M are integers, N<M, and N is greater than 0;
    a specifier which specifies a terminal apparatus to which a training signal to be assigned to a stream other than the N of M streams, is to be transmitted, among terminal apparatuses to which the plurality of data signals contained in the packet signal generated by said generator are to be transmitted respectively;
    an adding unit including:
        a first adder which appends a training signal to be assigned to a stream other than the N of M streams, to a position anterior to a leading data signal when a data signal which is to be transmitted to the terminal apparatus specified by said specifier is contained in an anterior part of the packet signal generated by said generator; and
        a second adder which moves a data signal to a posterior part of the packet signal and then appends a training signal to be assigned to a stream other than the N of M streams, to an anterior part preceding the moved data signal and which appends a training signal to be assigned to the N of M streams, to a position anterior to the leading data signal when the data signal which is to be transmitted to the terminal apparatus specified by said specifier is not contained in the anterior part of the packet signal generated by said generator; and
    a transmitter which transmits the packet signal to which the training signal has been appended by said adding unit.

2. A radio apparatus according to claim 1, wherein said generator is such that
    a data signal of a higher data rate is assigned to an anterior part of packet signal, and
    a data signal of a lower data rate is assigned toward a posterior part of packet signal.

3. A radio apparatus according to claim 1, wherein at the time of generating the packet signal said generator appends control signals, indicating a terminal apparatus that should transmit a data signal, to the plurality of signal data, respectively.

4. A radio apparatus according to claim 1, further comprising a receiver which receives a request indicating that a training signal to be assigned to a stream other than the N of M streams, needs to be transmitted,
wherein said specifier specifies a terminal apparatus corresponding to the request received by said receiver.

5. A radio apparatus according to claim 1, wherein, if the specifier does not receive information on data rate from a terminal apparatus over a certain period of time, said specifier specifies the terminal apparatus, and
wherein when appending the training signal to be assigned to a stream other than the N of M streams, to the data signals which are to be transmitted to the terminal apparatus specified by said specifier, said adding unit appends a request to cause the terminal apparatus to transmit the information on data rate.

6. A radio apparatus according to claim 1, wherein said adding unit appends training signals to the N of M streams where a data signal is assigned and the stream other than the N of M streams where no data signal, respectively, and assigns a training signal in the stream other than the N of M streams to a timing other than a timing to which a data signal and a training signal in the N of M streams are assigned.

7. A radio apparatus according to claim 6, wherein said adding unit is such that
using a training signal, as a reference, assigned to one of the N of M streams, a cyclic timing shift within a training signal is applied to a training signal assigned to the other streams of the N of M streams and a timing shift is also applied to a training signal assigned to the stream other than the N of M streams,
degrees of priority are set beforehand to amounts of timing shift and, for the N of M streams, the amounts of timing shift are used, in order, from one having a higher degree of priority, and
for the stream other than the N of M streams, the amounts of timing shift are used, in order, from one having a higher degree of priority.

8. A radio apparatus according to claim 7, wherein in said adding unit a training signal in the N of M streams and a training signal in the stream other than the N of M streams are formed by repeating a predetermined unit in time domain,
a combination of signs of the predetermined unit is defined so that an orthogonality holds among the M streams, and
the combination of signs of the predetermined unit is so defined as to be fixed in the M streams, respectively.

9. A radio apparatus according to claim 7, wherein in said adding unit training signals in the N of M streams and training signals in streams other than the N of M streams are formed by repeating a predetermined unit in time domain,
while a combination of signs of the predetermined unit is defined so that an orthogonality holds among the N of M streams and among the streams other than N of M streams, respectively, a degree of priority is given beforehand to the combination of signs of the predetermined unit, and
for the N of M streams, combinations of signs are used in order, from one having a higher degree of priority and, for the stream other than the N of M streams, combinations of signs are used in order, from one having a higher degree of priority.

10. A radio apparatus according to claim 7, wherein said adding unit is such that the cyclic timing shift is applied to a data signal, and an amount of timing shift for the N of M stream is used as the amount of timing shift.

11. A radio apparatus according to claim 7, further comprising a modifier which modifies at least a data signal, to which a training signal has been appended, among packet signals to which the training signal has been appended, and outputs a modified signal to said transmitter,
said modifier including:
a first processor which extends the number of N of M streams up to the number of a plurality of streams and then, for the extended stream, applies a cyclic timing shift within a training signal to a training signal assigned to the other streams using as a reference a training signal assigned to one of the extended streams; and
a second processor which extends the number of streams other than the N of M streams up to the number of a plurality of streams and then, for the extended streams, applies a cyclic timing shift within a training signal to a training signal assigned to the other streams using as a reference a training signal assigned to one of the extended streams,
wherein the amount of timing shift is set in a manner that the respective values of timing shift amounts used for the streams extended in the first processor are respectively equal to those for the streams extended in the second processor.

12. A radio apparatus according to claim 11, wherein an absolute value of the timing shift amount in said adding unit is so set as to be greater than that in said modifier.

13. A radio apparatus according to claim 6, wherein said adding unit is such that
using a training signal, as a reference, assigned to one of the N of M streams, a cyclic timing shift within a training signal is applied to a training signal assigned to the other streams of the N of M streams and a timing shift is also applied to a training signal assigned to the stream other than the N of M streams, and
different values of amounts of timing shift are set to the M streams, respectively.

14. A radio apparatus according to claim 1, wherein training signals to be assigned to the N of M streams and the stream other than the N of M streams, respectively, are operative in a MIMO system.

* * * * *